United States Patent [19]

Fechner et al.

[11] Patent Number: 4,758,291

[45] Date of Patent: * Jul. 19, 1988

[54] METHOD AND APPARATUS FOR AUTOMATICALLY APPLYING LINING MATERIAL TO LARGE-AREA WALL SURFACES

[75] Inventors: Gerald Fechner, Seesen; Rolf Meyer; Gerhard Porrmann, both of Bockenem, all of Fed. Rep. of Germany

[73] Assignee: Haw Harzer Apparatewerke KG, Schwemann & Althoff, Bockenem, Fed. Rep. of Germany

[*] Notice: The portion of the term of this patent subsequent to May 12, 2004 has been disclaimed.

[21] Appl. No.: 945,336

[22] Filed: Dec. 22, 1986

Related U.S. Application Data

[63] Continuation-in-part of Ser. No. 744,135, Jun. 12, 1985, Pat. No. 4,664,741.

[30] Foreign Application Priority Data

Jun. 14, 1984 [DE] Fed. Rep. of Germany ....... 3422116

[51] Int. Cl.$^4$ .............................................. B44C 7/06
[52] U.S. Cl. ...................................... 156/71; 156/391; 156/523; 156/526; 156/527; 156/574; 156/575; 156/577; 156/578
[58] Field of Search ............... 156/391, 523, 526, 574, 156/575, 577, 578, 527, 71; 29/110, 116 R, 121.1, 130

[56] References Cited

U.S. PATENT DOCUMENTS

| | | |
|---|---|---|
| 3,404,058 | 10/1968 | Fink .................... 156/527 |
| 3,960,643 | 6/1976 | Dargitz et al. ................. 156/526 |
| 3,966,533 | 6/1976 | Goldsworthy et al. ......... 156/379.8 |
| 4,075,053 | 2/1978 | Adams ............................ 156/577 |
| 4,208,238 | 6/1980 | August et al. ........................ 156/574 |
| 4,461,669 | 7/1984 | Dontscheff .......................... 156/574 |
| 4,664,741 | 5/1987 | Fechner et al. ..................... 156/574 |

FOREIGN PATENT DOCUMENTS 0094805 11/1983 European Pat. Off. .

Primary Examiner—Jerome Massie
Assistant Examiner—Jeff H. Aftergut
Attorney, Agent, or Firm—Karl F. Ross; Herbert Dubno

[57] ABSTRACT

An automatically operating apparatus is disclosed for applying webs of rubber or similar lining material of predetermined width and length to expanded surfaces of walls of steel in vessels, reactors of apparatuses and for pressing said webs thereagainst, with said apparatus comprising a guide frame for a drivable carriage and with said guide frame being easily mountable to follow surfaces of different lengths. Mounted on said carriage is an unwinding means for the web material as well as drivable position and pressing head adapted to be moved in the longitudinal direction of said carriage. The assembly is such that during operation, said pressing head is caused to steadily move along a zig-zag path and, in the course of unrolling said web material from the supply reel, said head positions said web portion against the surface to be lined progressively from left to right and from right to left and presses said web portion thereagainst at a constant predetermined pressure. By means of devices mounted on said carriage, application of the webs is accomplished simultaneously with the formation of a seam overlapping with the previously applied web and finishing treatment of this overlap seam and the preparation of the next overlap seam, which means obliquely cutting the open longitudinal edge of the web.

20 Claims, 4 Drawing Sheets

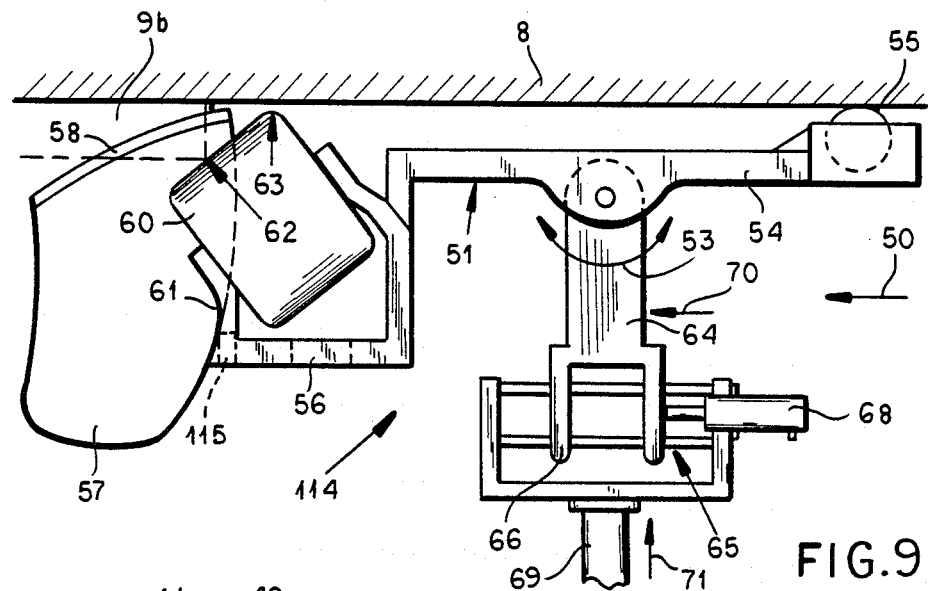
FIG. 9
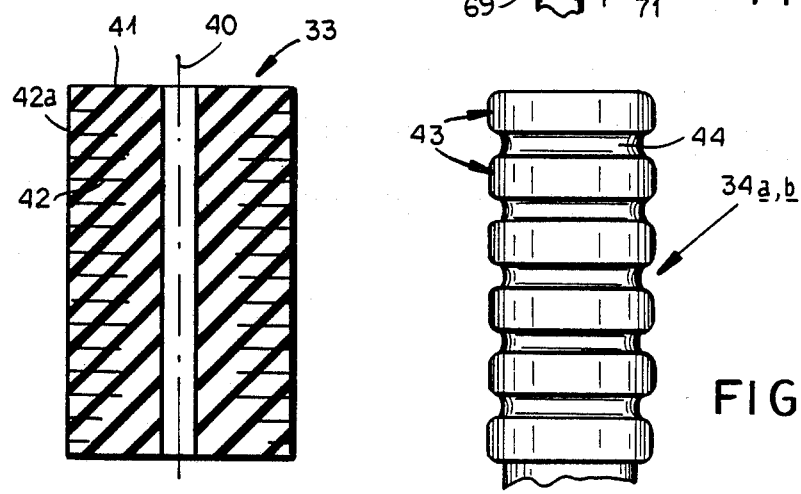
FIG. 6
FIG. 7
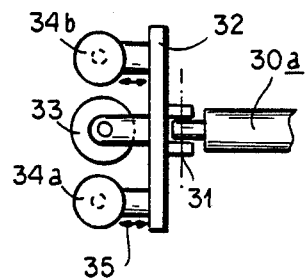
FIG. 5
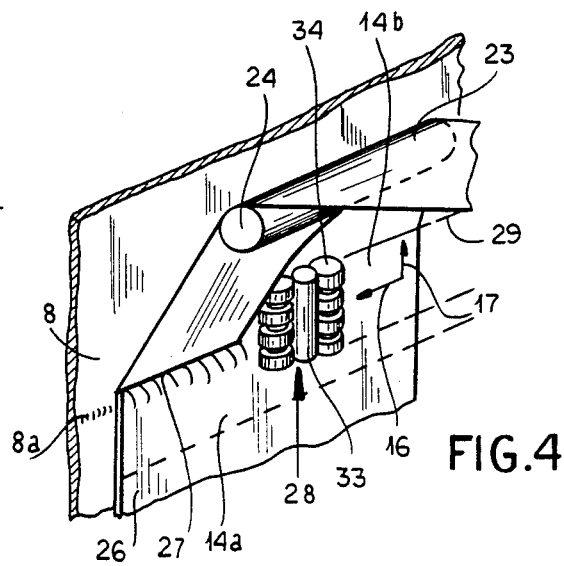
FIG. 4

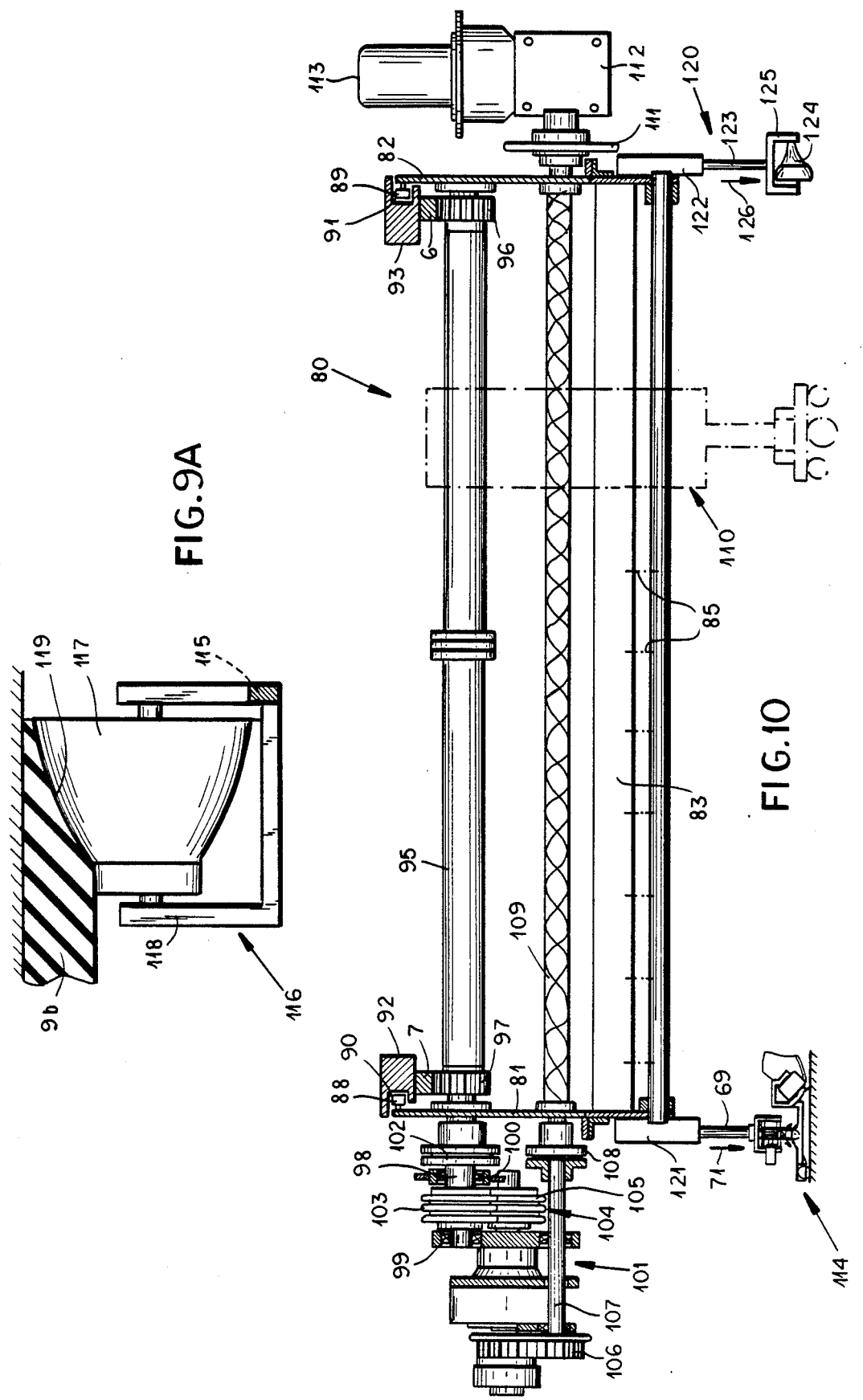

METHOD AND APPARATUS FOR AUTOMATICALLY APPLYING LINING MATERIAL TO LARGE-AREA WALL SURFACES

CROSS REFERENCE TO RELATED APPLICATION

This application is a continuation-in-part of our commonly owned copending application Ser. No. 744,135 filed June 12, 1985 (now U.S. Pat. No. 4,664,741 at May 12, 1987).

FIELD OF THE INVENTION

Our present invention relates to an apparatus for automatically applying a lining material in web form, e.g. of rubber, to large-area wall surfaces, particularly to steel walls of vessels, reactors and the like.

BACKGROUND OF THE INVENTION

In various fields of application, a corrosion-proof lining, e.g. of rubber or a synthetic resin material, can be applied to large-area walls of vessels, reactors or the like. Usually the lining material, which derives from a roller and has a given width, is manually laid upon the surfaces.

The web of the lining material can be cut to a length equal to the wall height, can be unrolled from above over the height of the wall surface and can be pressed against the wall surface with sufficient pressure to drive out air between the web and the wall and which otherwise may be entrapped. The adjoining edges of successive strips can be subject to special treatment, i.e. can form an overlap seam, to maintain the continuity of the lining.

The processes involved in applying such strips, in treating the seams and, in general, in lining large vessels in this manner, are onerous, time-consuming and labor-intensive so the procedures are very expensive.

OBJECT OF THE INVENTION

It is the principal object of the present invention to provide an apparatus which advances the principles of the above-mentioned prior application and ensures a uniform bond strength between the lining material and the wall which is capable of rapidly and with reduced labor cost, lining wide-area surfaces without the drawbacks of earlier techniques.

Still another object of this invention is to provide an apparatus for substantially automatically lining a large-area wall surface of a vessel which provides a more reliable lining and which ensures reproducible characteristics of the lining material over the entire lining.

Yet another object of our present invention is to provide an improved method of lining the wall of a large vessel.

SUMMARY OF THE INVENTION

These objects and others are attained in accordance with the present invention which comprises an apparatus for automatically applying webs of rubber or other material capable of bonding, to a wall surface, to the walls of a vessel or the like, which apparatus comprises a guide frame having a width and a height which may correspond to the width of the web material and the height of the wall surface to be lined, a carriage movable longitudinally of the guide frame, i.e. upwardly along the height of the wall which is to be lined at a predetermined rate, a supply of the lining material on this carriage, means displaceable longitudinally of the carriage and in a direction transverse to its displacement along the frame in a reciprocating manner, the latter means being referred to as a pressing head, and at least one pressing roller on this head for pressing the web against the wall to be lined during the back and forth movement of a head along the carriage which the carriage progressively advances in the direction of the length of the strip which is applied.

An adhesive applicator is mounted on the carriage for applying adhesive to the web, and a seam-treating means can be provided on one end of this carriage for shaping the edge of the freshly applied web to allow a seam to be formed when the next strip is applied, the latter means including a means for shaving or cutting the free edge of the strip.

On the opposite end of the carriage, a seam-treating device can be provided for pressing the overlapping edges of successively applied strips into sealing relationship as the carriage continuously advances along the length of the strip which is newly applied.

While the invention is best described for webs which are to be applied to vertical or upright walls, it should be understood that it is equally applicable for horizontal or inclined walls and is not to be restricted in interpretation to vertical walls with the movement of the carriage in the direction of application of the strip coupled with a back and forth movement of the pressing head and pressing roller. There is a continuous application of the web with any distortion or entrapping of air being avoided. The web may be coated with an adhesive on the device or may be applied to a wall surface previously coated with adhesive.

The apparatus or subassemblies thereof can be inserted into the interiors of vessels or reactors through corresponding manholes and the apparatus can be shifted step by step along the surface to be lined to allow the webs to be positioned side by side or in overlapping relationship.

The apparatus has been found to be particularly advantageous, since it allows preparation of the seam and the edge to later form a seam to be carried out concurrently with application of the strip and because it allows application of the strip from bottom to top while driving out entrapped air continuously, no problems arise even where the web is applied over a weld seam.

According to the features of the invention, the pressing head which is reciprocated along the carriage transversely to the direction of the carriage movement includes a resilient pressing means on a roller holder which comprises a center pressing roller adapted to press the lining material against the wall to be lined with a predetermined force and whose axis of rotation is substantially parallel to the carriage feed direction. A pair of positioning rollers flank the pressing roller on the holder and are rotatable about an axis parallel to the pressing roller, the forward positioning roller in each direction of reciprocation of the head serving to guide the obliquely lying web smoothly against the wall.

The positioning roller has a roller surface contoured so as to directly engage the web only in strip-like areas spaced apart from one another so that entrapped air beneath the web material is reliably and safely displaced in a lateral movement.

After the lining material has been placed against the wall, the following pressing roller is urged against the positioned web with a predetermined constant force so that the web material will adhere to the wall and any remaining air driven out, thereby ensuring the required bond strength.

The pressing roller can be a cylinder roller of rubber or a similar material and the circumference of the pressing roller can be subdivided into annular zones which can be axially spaced apart and each of which can function as the periphery of a disk.

Especially where the material of which the pressing roller is constituted has a certain degree of resilient compressibility, this construction allows the circumference of the pressing roller to accommodate any irregularity of the wall to which the lining is applied so that excellent and uniform bond strength is achieved at all parts of the lining, independent of any irregularities which may be present on the wall.

With the exception of the points of direction change at the ends of the path of the pressing head, located along the longitudinal edges of the web or strip, the positioning of the pressing head of the invention continuously and uniformly follows the surface to be lined in both the longitudinal direction of the web and transversely thereto, i.e. along the zig-zag path with the successive path sections including a small acute angle therebetween. At the end of each path section and prior to reversal of movement, the pressing head should be brought into a newly aligned position so that the roller axes are now turned so that they lie orthogonal to the new path direction. Means is provided on the head or carriage for this purpose. This avoids crowding of the material because the rollers always rotate about axes which are perpendicular to the direction of travel of the head along the web.

BRIEF DESCRIPTION OF THE DRAWING

The above and other objects, features and advantages of the present invention will become more readily apparent hereinafter, reference being made to the accompanying highly diagrammatic drawing, in which:

FIG. 4 is a perspective view diagrammatically illustrated, the application of a strip using the positioning and pressing head according to the invention;

FIG. 5 is a top view of the roller carrier of the positioning and pressing head;

FIG. 6 is a cross-sectional view of the pressing roller;

FIG. 7 is a side-elevational view of the positioning roller;

FIG. 9 is a plan view illustrating the cutting mechanism for preparing the edge of a strip as it is applied to form the seam when a subsequent strip is applied in accordance with the invention;

FIG. 9A is a fragmentary sectional view showing an adhesive applicator provided in conjunction with the seam-shaving mechanism of FIG. 9;

FIG. 10 is a horizontal section through a portion of the frame showing the carriage from above and partly broken away, the pressing head being shown only diagrammatically;

SPECIFIC DESCRIPTION

Figure 1:
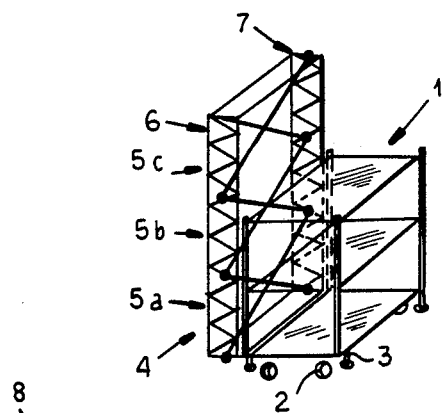
FIG. 1 is a highly diagrammatic perspective view showing the frame of the apparatus of the invention.

The apparatus shown in the drawing is mainly used for lining surfaces of vessels and reactors or like apparatus.

Consequently, to permit the apparatus to be inserted into the interior of the vessel through a conventional manhole or access opening, the apparatus may be easy to assemble and disassemble and, since the rack must correspond in height to the height of the wall surface to be lined, the rack or frame and the remainder of the apparatus should be easily adaptable to surfaces of various lengths.

In FIG. 1, we have shown an easily assemblable frame 1 mounted on rollers or casters 2 and having lowerable feet 3 which, upon lowering, secure the frame against movement relative to a wall to be lined, so that the pressing force may be applied to the lining material against this wall.

The guide frame portion 4 of the mobile frame structure 1 is rigidly attached to the latter and can be assembled from modular frame elements, if desired, adjusted to different heights.

The guide frame can be composed, where it is used for the lining of vertical walls, of separate required frame portions 5a, 5b, 5c which are so connected as to be stiff torsion. The frame portions 5a, 5b, 5c must be of different length and can be interchanged or replaced by parts which are otherwise similar but are of different lengths and can be readily attached and detached so that when they are attached together, they are in alignment with one another.

Rack portions 6 and 7 are provided along front edges of the guide frame 4 to extent over the full height thereof so that pinions of a carriage drive can engage the racks.

Referring now to FIG. 10, it can be seen that the carriage 80 can comprise a pair of end plates 81 and 82 which are affixed to a pair of tubular members 83 and 84 of polygonal cross section. Affixed to the tubular members 83 and 84 at a plurality of locations represented diagrammatically at 85 are a pair of guide rods 86 and 87 which lie in a common vertical plane and are also mounted on the end plates 81 and 82. Each of the end plates 81, 82 has a guide roller 88, 89 received in a channel 90, 91 formed in a longitudinal member 92 and 93 of the guide frame for carrying the racks 6 and 7, respectively.

A pinion drive shaft 95 is journaled on the plates 81, 82 and carries a pair of pinions 96 and 97 respectively meshing with the racks 6, 7 so that as the pinion drive shaft 95 is rotated, the carriage 80 rides up and down along the racks 6 and 7 and hence along the guide form. As has been indicated in broken lines, each roller 88 or 89 is paired with another roller, e.g. 88', also engaged in a respective channel to ensure stable guidance of the carriage 80.

A stub shaft 98 journaled in bearings 99 of a gear and clutch assembly 101 is connected to the shaft 95 by a shaft coupling 102 and carries one member 103 of a clutch 104 allowing the pinion drive shaft to be decoupled from the drive and locked at any given position, if desired. The other clutch part 105 is driven by gearing 106 from a shaft stub 107 likewise journaled in the unit 101 and connected by a shaft coupling 108 with a drive worm 109. The latter has oppositely extending helices, as is known for reciprocating displacement of a pressing head 110 shown only in dot-dash lines in FIG. 10 and illustrated in greater detail in FIGS. 11 and 12 and the parts of which are described in connection with FIGS. 3 through 8. The worm 109 is, in turn, connected by a shaft coupling 111 to a speed reducer 112 of an electric motor 113 mounted on the carriage 80.

The carriage 80 is also provided at one end thereof, i.e. on the end plate 81, with a cutting unit 114. This unit 114 has been illustrated in greater detail in FIG. 9. Below this trimming unit and suspended therefrom, e.g. by a bar 115 is an adhesive-applying unit 116 which can be constituted by a contoured roller 117 rotatable in a yoke 118 and supplied with an adhesive by any conventional means (not shown) for applying that adhesive to the trimmed edge 119 of the strip 96 which has just been applied and trimmed so that, when adhesive is applied to the wall of the vessel only and not to the rubber web to be applied, the overlap portion of a previously applied strip will nevertheless be adhesive coiled to permit an effective bond to be formed with the overlapping material.

The overlapping material is pressed against the trimmed edge of a previously applied strip by a seam-finishing unit 120 mounted on the other end plate 82.

Just as the trimming unit 114 has a cylinder 121 whose piston rod 69 can be shifted in the direction of arrow 71 as will be described in connection with FIG. 9. The seam-finishing unit 120 has a cylinder 122 whose piston rod 123 can press the contoured roller 124 journaled in the yoke 125 against the seam in the direction represented by the arrow 126.

Figure 2:
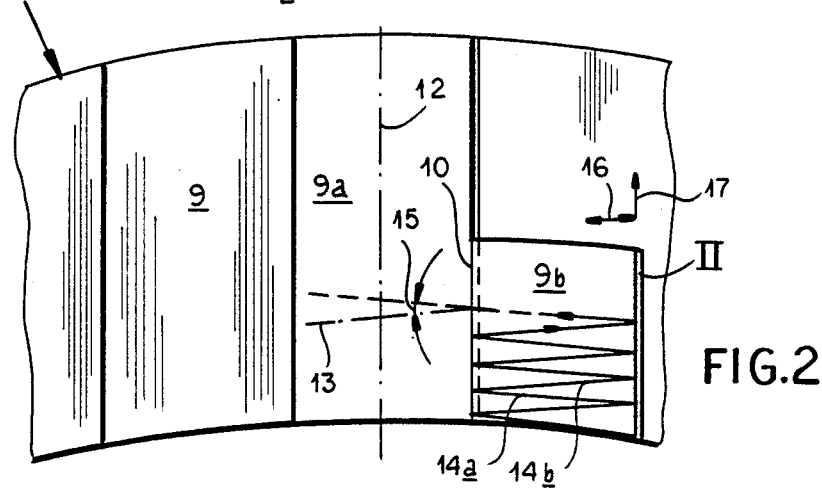
FIG. 2 is another diagram representing a wall portion of a vessel which has already been lined in part with a lining material in strip form showing the progress of lining with another length of strip.

While the drive 111-113 carries the carriage to travel from the bottom to the top at the preset rate to accomplish a working cycle, the carriage must be returned downwardly to its initial position at a high rate. During the continuous upward movement, the cross-threaded worm or spindle 109 reciprocates the pressing head 110 so that the roller assembly of the pressing head performs a zig-zag movement with segments 14a and 14b as illustrated in FIG. 2.

The two driving directions are indicated by arrows 16 and 17. FIG. 2 depicts a portion of the steel wall 8 of a vessel to be lined, for instance, of a circular container. 9 and 9a designate lining webs of rubber that have already been applied in the wall.

The broken line 12 designates the longitudinal center line of the webs that have already been applied, whereas a reference line extending transversely to said longitudinal center line is indicated by 13. Path sections 14a, 14b and reference line 13 define an angle 15 amounting from 1° to 10°, in the embodiment shown, angle 15 amounts to 2.5°.

Figure 12:
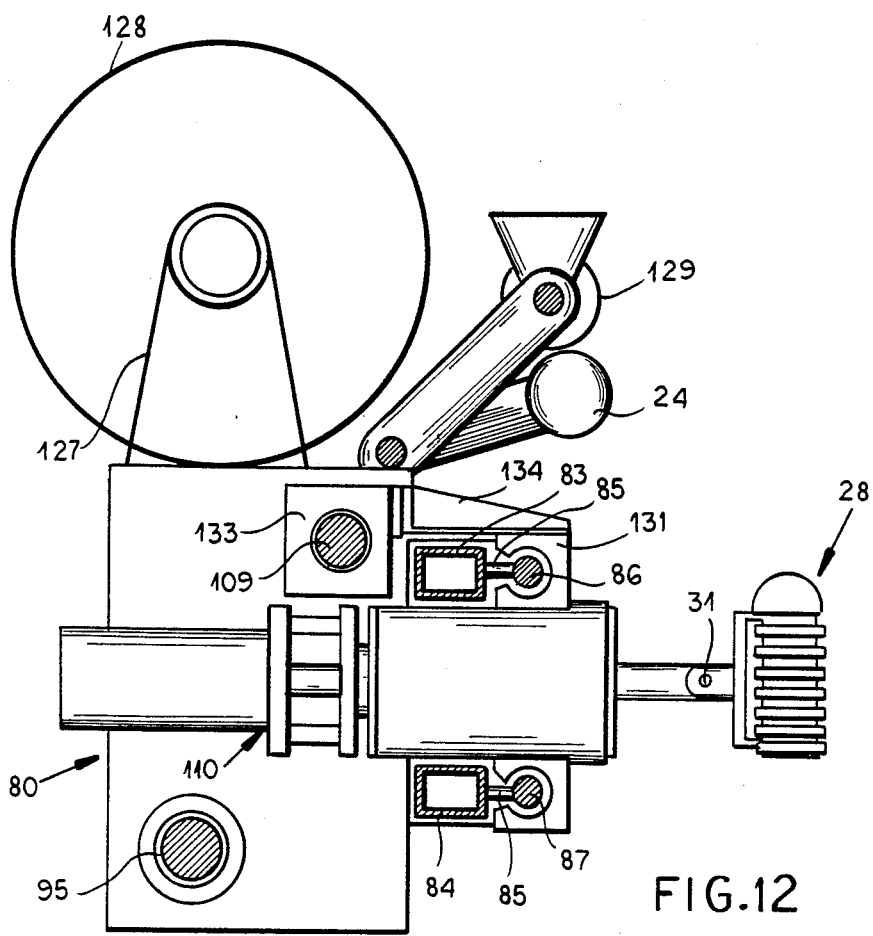
FIG. 12 is a vertical section through a portion of the carriage showing the pressing head in elevation in its relationship to parts which were omitted in FIG. 11.

As can be seen from FIG. 12, the carriage 80 is provided a mounting arrangement 127 for a reel 128 on which the web or strip of rubber, precut to its final length, and a masking web of cloth or paper foil are wound. If the rubber has been precoated with an adhesive which is exposed by removal of the masking layer, an adhesive applicator 129 also mounted in the carriage 80 can be dispensed with and this application can be replaced by a roll which winds up the removed masking strip, the web of rubber unwound from the reel passes over a guide roller 24 (see FIGS. 4 and 12) holding the web in a spaced relationship to the surface 8 to be lined and above the roller set 2 of the positioning and pressing head.

Figure 11:
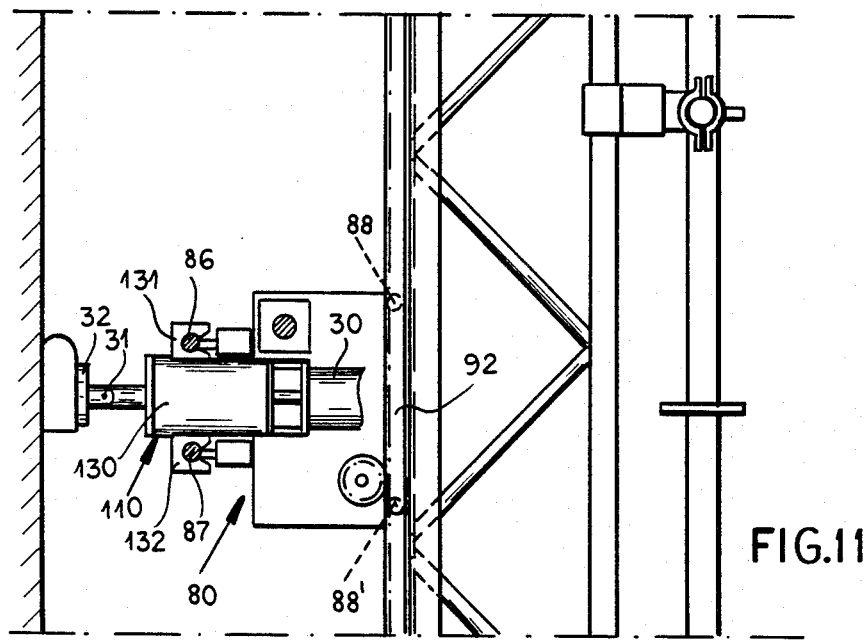
FIG. 11 is a vertical section diagrammatically showing the carriage and the pressing head from the side, the supply roll, the deflection roller and other structures relevant to the application of the strip being omitted.

The positioning and pressing head, as a whole, is represented at 110 in FIGS. 10-12 and comprises a bearing body 130 in which the cylinder 30 is at least limitedly rotatable but is axially fixed. The bearing body 130 has guides 131, 132 which slidably surround the guide rods 86, 87 to allow movement of the head 110, which coupled with the drive worm 109, a worm-engaging element 133 connected to the apparatus which is connected to the upper guide rod 131 by a bracket 134.

To enable application of the web, the carriage is moved downwards along guide frame 4. The material web is unwound from the supply reel until its front edge somewhat projects over the bottom edge of wall 8 to be lined. Prior to this unwinding process, engaging elements 3 are released and guide frame 4 and wheeled, ground-engaging erecting frame 1 are laterally shifted via rollers 2 from the position in front of web 9a and are aligned with wall 8 and with the exposed edge of web 9a. Wheeled erecting frame 1 is then fixed through its engaging elements 3 and guide frame 4 is directly tightened to the steel wall 8 to be lined with the aid of upper electromagnetic tightening means that have not been illustrated.

Positioning and pressing head 28 approximately located in the center position of the carriage is then advanced from its withdrawn rest position into its working position towards the wall to be lined; afterwards, the drive is switched on. Following zig-zag path 14a, 14b, the web is then progressively and alternately from left to right and from right to left, brought into positive engagement with the surface of the wall 8 to be lined by means of the positioning and pressing head rollers, with the web portion 25 obliquely extending relative to wall 8 being successively urged against said wall by the rollers.

FIG. 4 shows the upper edge 27 of the web to be positioned and pressed by roller set 28 during the preceding path section followed from left to right. 25 designates the web portion that has already been applied to the wall and pressed thereagainst. In FIG. 4 the roller set 28 is moving along a path section from right to left. Behind said roller set 28, a new edge 29 is formed at a higher level between said portion 26 already pressed against the wall surface and the obliquely supplied web portions 25.

The roller set includes a center press roller 33 rigidly supported by a roller holder 32. Roller 33 is formed from a cylindrical solid rubber body 41 having a center bore 41 for accommodating the rotatable shaft. Recesses 42 of predetermined and largely constant depths are cut into the rubber roller from the circumference thereof, at predetermined distances from the axis, the depths of said recesses successively decreasing merely towards the face sides of said roller 33, as indicated by 42a.

The depths of said recesses may, for instance, range from 8 to 12 mm when measured from the circumference. The find recesses or cuts subdivide said cylindrical rubber body into a series of disk-like portions directly resting on each other.

This type of design permits the press roller 33 circumference to be very accurately adapted to even more abrupt surface structures of the wall to be lined, such as, for instance, weld 8a shown in FIG. 4, and thus allows the pressure exerted upon axis 40 of roller 33 to be uniformly transmitted from the circumferential surface of said roller 33 to the web of rubber, the circumferential surface being nonetheless accurately adapted to all irregularities and the pressing of the web against the surface including such irregularities being guaranteed as well.

In the direction of movement, along path sections 14a, 14b, one position roller 34a, 34b each travels in front of said press roller 33. Said position rollers are also supported by roller holder 32 on the same axis, support of said position rollers, however, not being effected in a rigid fashion, as in the case of press roller 33, but in a way so as to be resiliently flexible, as indicated by arrow 35, so that the pressure exerted upon the web by said position rollers is relatively small, however, sufficient to progressively urge web portion 25 from the inclined position when supplied against the surface of wall 8, as illustrated in FIG. 4.

Each position roller is formed of a relatively rigid cylinder member, for instance, of synthetic material, including uniformly spaced annular grooves 44 of considerable width and thus the cylinder surface of said roller actually only comprises annular lands 43. This type of position-roller design is advantageous, because the pressure exerted when the web is positioned, is applied to the rubber material in a strip-like manner only and, consequently, areas remain between the surface of wall 8 and the web of rubber along which the entrapped air is safely ejected in a lateral movement, under the influence of said position rollers. Hence, said pressing roller 33 only has to apply the pressure required to obtain the desired bond strength.

Figure 8:
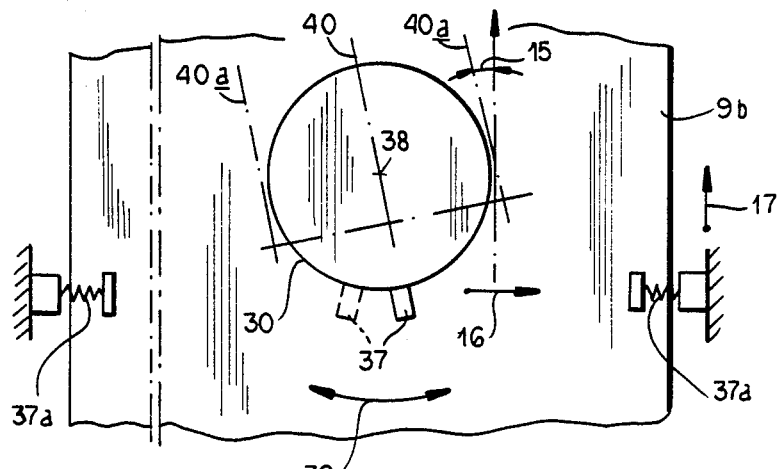
FIG. 8 is a diagram of the mechanism provided for orienting the axes of the rollers perpendicular to their path with reciprocation of the pressing head.

Roller holder 32 is attached to the piston rod 30a of an air-pressure cylinder so as to be pivotable about an axis approximately parallel to the transverse reference line 31, cylinder case 30 of said air pressure cylinder being shown in FIG. 8.

The pneumatic cylinder is part of the positioning and pressing head and is reciprocated along the carriage, as indicated by arrow 16, at a predetermined rate. In the case of the pneumatic cylinder depicted in the embodiment, the piston is moved in the cylinder case 30 in a fashion free from all sealings and, consequently, compressed air is permitted to permanently escape from said cylinder case in a manner that a horizontal characteristic curve indicative of the pressure applied to said roller holder 32 by the cylinder is obtained. Piston and/or piston rod 30a are moved in said cylinder case 30 so as to be prevented from rotation. Cylinder case 30 is secured to said positioning and pressing head so as to be rotatable about its longitudinal axis 38. Rotational movement is restricted to a predetermined angle by means of stops and catches.

Cylinder rotation about its longitudinal axis is accomplished via an actuating arm 37 and flexible stops 37a disposed on the carriage at the ends of path sections 14a, 14b. The assembly is such that the roller axes defined a small angle of of preferably approximately 2.5° relative to the longitudinal center line 12 in a way so as to allow said roller axes 40, 40a to be perpendicular to each path section 14a, 14b. At the end of each path section, the inclination holder 32 is automatically inverted, as indicated by the pivoting movement (arrow 39) of said cylinder case 30.

Angles 15, according to FIG. 2 and FIG. 8, are selected such that, in dependence upon the feed motion 17 of the carriage, the distance of said carriage in the direction of movement 17, according to FIG. 2, during a transversal movement 14a and 14b, respectively, of said positioning and pressing head is equal to or smaller than the axial length of said pressing roller 33.

Angles 15, shown in FIGS. 2 and 8, also result therefrom. Path sections 14a, 14b depicted in FIG. 2 are also shown in FIG. 4 with respect to roller set 28.

Accomplishing the upward movement of the carriage along guide frame 4 simultaneously and independently also causes the formation of overlap seam 10 and its finishing treatment as well as the preparation of the open longitudinal edge of web 9b which will form the next overlap seam.

Figure 3:
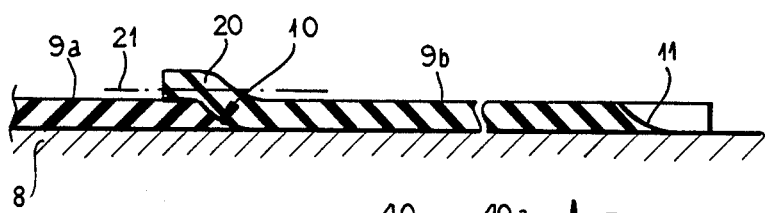
FIG. 3 is an enlarged section of the overlap seam between adjacent webs of strips.

As indicated by 11 in FIG. 3 the open longitudinal edge of web material 9b is obliquely cut toward the surface of wall 8 as the carriage moves upwards. To this effect, a means for obliquely cutting the edges is mounted on the right side of the carriage according to FIG. 2. Said means includes a cylinder, preferably a pneumatic one, secured to the carriage and capable of urging said means for obliquely cutting the edges from a rest position against the surface of the wall 8 to be lined at a predetermined biasing force. FIG. 9 shows the piston rod 69 of said pneumatic cylinder, whereas arrow 71 indicates the positioning and biasing direction. At the end of said piston rod 69, there is provided a transverse guide means 65 for carriage-type fork 9b by means of a pneumatic cylinder 68 and at a defined pressure.

The means for obliquely cutting the edges further, includes a rocker-type supporting member 51 mounted at the end of carrier arm 64 so as to be pivotable about an axis (the direction of pivoting movement is indicated by arrow 53) extending parallel to said longitudinal edge 11. Arm 54 facing away from said edge is provided at its end, with an engaging member, such as engaging ball 55, poor in friction and brought into contact with the inner surface of wall 8. Further, arm 56 includes a movable unit comprising a blade 57 and a tracing roller 60. Blade 57 is rigidly attached to said arm and has an oblique cutting edge 58 corresponding to the cutting line 11, with said cutting edge being slightly convexly bent in the cutting direction to accomplish a cut along the open small face of said web 9b, with said cut tangentially extending toward the surface of wall 8.

Tracing roller 60 is sued for accurately guiding cutting edge 58, the rotational axis 61 of said tracing roller 60 being obliquely positioned relative to the surface of wall 8 in a way as to permit the circumference of said tracing roller to be brought into contact with edge 62 of the small face of web 9b facing away from the surface of wall 8 while its own circumferential edge 63 is simultaneously brought into contact with the surface of wall 8.

This type of combined biasing forces acting according to arrows 70, 71 permits the roller to permanently be in intimate contact at both reference points 62, 63, and thus the face side of web 9b is obliquely cut in the course of the forward movement of the carriage along the guide frame 4.

Above said means for obliquely cutting the edges 50 a pressing roller may be attached to the carriage for additionally urging, for instance, by means of a pneumatic cylinder, said open edge of web 9b once more against the surface of wall 8 at a predetermined force before the edge is obliquely cut.

Furthermore, downstream of said means for obliquely cutting the edges another means may be mounted on the carriage for applying an adhesive or the like to the newly cut edge in the course of carriage movement.

While applying web 9b to the wall, overlap seam 10 is formed between the other longitudinal edge of said web and the open, obliquely cut longitudinal edge of web 9a, previously applied to the wall.

To this effect, a pressing roller provided on the other end of the carriage is adapted to be positioned against the overlapping edge portions of the two webs by means of a pneumatic cylinder, for instance, to again press said overlapped portions at a predetermined pressing force into mutual engagement and to thus provide for a reliable connection between the two overlapping edge portions of the webs.

Downstream of said pressing roller, a finishing means including a cutting edge may be provided, said cutting edge being adjusted via guide rollers travelling along both webs 9a, 9b in such a manner that a cut 21 (FIG. 3) is accomplished along said overlap seam in a fashion parallel to the surface of said webs, with the cutting plane either coinciding with the surface of said webs or being slightly, for instance, approximately 1 mm, spaced apart from the surface of said webs. Any material projecting over said seam being reliably removed in this finishing process.

The cutting edges of the cutting means provided on both ends of the carriage may be conventionally heated.

After the web has been laid on the wall surface, the carriage is rapidly moved downwards in case of the illustrated embodiment, of lining perpendicular walls, prior to this downward movement, all members mounted on the carriage are to be withdrawn.

The empty reel and the reel around which said release-web material has been wound are removed and a new material-supply reel is inserted.

After said tightening means have been released, said guide frame 4 is shifted along the surface to be lined according to the width of one material web, is aligned with the longitudinal edge of the previously applied web and with the surface to be lined and is fixed again so that the next application cycle may be started without delay as has been described hereinbefore in more detail.

We claim:

1. An apparatus for automatically applying a web of a flexible material as a lining to an upright wall surface, said apparatus comprising:

a mobile guide frame juxtaposable with said wall surface;

a carriage formed with horizontal guides vertically displaceable on said frame along said wall surface;

web-guiding means on said carriage for feeding said web continuously into juxtaposition with said wall surface for adhesive bonding thereto as said web-guiding means is displaced on said frame by said carriage in a direction so as to cover a strip of said wall surface with said web;

a positioning and pressing head on said carriage displaceable back and forth along said guides across said web transverse to said direction while said carriage is displaced vertically to also enable said head to advance in said direction so that said head moves in a zig zag pattern relative to said wall surface, said head having at least one roller rotatable about an axis extending generally in said direction, and means for pressing said roller against said web and said web against said strip of said wall surface to bond said web thereto; and cutting means mounted on said carriage for movement in said direction together with said advance for obliquely cutting a free edge of said web as is adhesively bonded to said strip of said wall surface, thereby enabling a web adapted to be applied to an adjacent strip to overlap the adhesively bonded web, said mobile guide frame being shiftable into juxtaposition with said adjacent strip upon completion of lining of the first-mentioned strip.

2. An apparatus for automatically applying a web of a flexible material as a lining to an upright wall surface, said apparatus comprising:

a mobile guide frame juxtaposed with said wall surface;

a carriage formed with horizontal guides vertically displaceable on said frame along said wall surface;

web-guiding means on said carriage for feeding said web continuously into juxtaposition with said wall surface for adhesive bonding thereto as said web-guiding means is displaced on said frame by said carriage in a direction so as to cover a strip of said wall surface with said web;

a positioning and pressing head on said cariage displaceable back and forth along said guides across said web transverse to said direction while said carriage is displaced vertically to also enable said head to advance in said direction so that said head moves in a zig zag pattern relative to said wall surface, said head having at least one roller rotatable about an axis exending generally in said direction, and means for pressing said roller against said web and said web against said strip of said wall surface to bond said web thereto; and cutting means mounted on said carriage for movement in said direction together with said advance for obliquely cutting a free edge of said web as is adhesively bonded to said strip of said wall surface, thereby enabling a web adapted to be applied to an adjacent strip to overlap the adhesively bonded web, said mobile guide frame being shiftable into juxtaposition with said adjacent strip upon completion of lining of the first-mentioned strip, said guide frame including a plurality of interchangeable frame portions of graded lengths mounted in alignment in said direction of said frame portions defining edges, each of said edges being provided with a respective rack, said carriage carrying respective pinions meshing with said rack and being provided with a drive for rotating said pinions and thereby displacing said carriage in said direction.

3. The apparatus defined in claim 2 wherein said carriage is provided with means conected to said head for displacing said head back and forth across said web transverse to said direction in a zig-zag path of rectilinear segments including angles between 1° and 10° with one another.

4. The apparatus defined in claim 2 wherein said cutting means includes a guide roller for tracing the edge of the web applied to the first mentioned strip of said wall surface and a cutting blade connected with said guide roller for trimming said edge.

5. The apparatus defined in claim 4 wherein said cutting blade has a convex curvature so that the oblique cut of said free edge of said web is outwardly convex.

6. The apparatus defined in claim 4 wherein said cutting means includes a rocker carrying said guide roller and said blade including an arm of said rocker and a low fraction member bearing on said wall surface and connected to another arm of said rocker.

7. The apparatus defined in claim 2 wherein said web guiding means is located on said carriage above said head.

8. The apparatus defined in claim 2 wherein said head comprises a roller holder, a fluid operating cylinder connected to said holder for displacing same against said web to press said web against said surface, a central pressing roller journaled on said holder about an axis extending generally in said direction adapted to bear upon said web and a pair of positioning rollers journaled on said holder flanking said pressing roller and rotatable about respective axes generally parallel to the axis of said pressing roller.

9. The apparatus defined in claim 8 wherein each of said positioning rollers has a roller body formed with axially spaced outwardly open annular circumferential grooves.

10. The apparatus defined in claim 8 wherein said pressing roller is a cylindrical roller formed with annular slits in an axially spaced relationship therealong.

11. The apparatus defined in claim 8, further comprising means for swinging said holder upon determination of travel back and forth to tilt said axes alternately in opposite directions with respect to said direction of advance, so that during the back and forth movement of said head, said axes assume angles of 1° to 10° with respect to the direction of advance.

12. The apparatus defined in claim 2, further comprising an adhesive applicator on said carriage for applying adhesive to the cut-free edge of said web.

13. The apparatus defined in claim 2 wherein said positioning and pressing head is mounted at one end of said carriage, said apparatus further comprising a seam-pressing member mounted on an opposite end of said carriage for pressing overlapping portions of webs of said material together during the movement of said carriage in said direction to form a finished seam between adjoining webs.

14. The apparatus defined in claim 2 wherein said drive includes a common shaft carrying said pinions, said carriage further having a crossthread worm rotatable on said carriage and extending parallel to said shaft and connected to said head for reciprocating same, and a gear and clutch mechanism operatively connecting said worm and said shaft.

15. The apparatus defined in claim 14 wherein said carriage is formed with a pair of guide bars parallel to said worm and said shaft, said head having a bearing body provided with guides engaging said bars.

16. The apparatus defined in claim 15 wherein said bars are each mounted on a respective tubular member of polygonal cross-section extending the length of said carriage.

17. The apparatus defined in claim 16 wherein said head comprises a cylinder rotatable limitedly in said bearing body about an axis perpendicular to said direction and cooperating with formations at opposite ends of said carriage and tilting said roller alternately in opposite directions about the latter axis.

18. The apparatus defined in claim 17 wherein said positioning and pressing head is formed with a holder mounted on a piston rod of a piston shiftable in said cylinder and carrying a pressing roller flanked by a pair of positioning rollers, all of said rollers having mutually parallel axes.

19. The apparatus defined in claim 18 wherein said carriage is provided with a reel for a roll of said web and a guide roller extending along said carriage for guiding said web onto said wall surface.

20. A method of lining an upright wall surface of a vessel which comprises the steps of:
 automatically unrolling a web of lining material along an upright wall surface progressively in an upward direction;
 displacing a pressing head back and forth transverse to said direction in a zig-zag path consisting of rectilinear segments including an angle of 1° to 10° between them, said head having a roller rotatable about an axis and pressing said web against said wall surface;
 reorienting the axis of said roller at the end of each of said segments so that the roller axis lies perpendicular to the next segment during its travel along said web concurrently with movement of said head, upwardly along said web and said wall surface, trimming a free edge of the web as it is applied to said wall to enable the formation of an overlap seam by overlap in the free trimmed edge of a portion of a web to be subsequently applied; and
 concurrently pressing an overlap proportion of the web as it is applied to said wall surface onto a previously cut free edge of a previously applied web to form a finished seam between successively applied webs.

* * * * *